US012545035B2

(12) United States Patent
Kaneko et al.

(10) Patent No.: US 12,545,035 B2
(45) Date of Patent: Feb. 10, 2026

(54) PRINTING DEVICE

(71) Applicant: SEIKO EPSON CORPORATION, Tokyo (JP)

(72) Inventors: Kenichiro Kaneko, Okaya (JP); Fusao Ohashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 18/543,011

(22) Filed: Dec. 18, 2023

(65) Prior Publication Data

US 2024/0198698 A1 Jun. 20, 2024

(30) Foreign Application Priority Data

Dec. 19, 2022 (JP) ................................ 2022-202191

(51) Int. Cl.
*B41J 11/00* (2006.01)
*B41J 2/045* (2006.01)
*B41J 11/62* (2006.01)

(52) U.S. Cl.
CPC ..... *B41J 11/00242* (2021.01); *B41J 2/04541* (2013.01); *B41J 11/62* (2013.01)

(58) Field of Classification Search
CPC . B41J 11/00214; B41J 11/0022; B41J 11/002; B41J 11/00216; B41J 11/00212; B41J 11/00218; B41J 11/62; B41J 2/0057; B65H 2301/4461; F26B 13/10
See application file for complete search history.

(56) References Cited

U.S. PATENT DOCUMENTS

| | | | | |
|---|---|---|---|---|
| 10,696,069 | B2 * | 6/2020 | Hatakeyama | B41J 13/009 |
| 2007/0120930 | A1 * | 5/2007 | Domoto | B41J 2/0057<br>347/102 |
| 2011/0234723 | A1 * | 9/2011 | Mandel | B41J 2/0057<br>399/307 |
| 2020/0130379 | A1 * | 4/2020 | Washio | B41J 11/00216 |
| 2020/0269608 | A1 | 8/2020 | Yoda | |
| 2022/0371340 | A1 * | 11/2022 | Kaburagi | B41J 11/00242 |

FOREIGN PATENT DOCUMENTS

JP 2020-138348 A 9/2020

* cited by examiner

*Primary Examiner* — John P Zimmermann
(74) *Attorney, Agent, or Firm* — WORKMAN NYDEGGER

(57) ABSTRACT

A printing device 11 includes a printing section 16 that performs printing by ejecting a liquid onto a transported medium 99, a support section 21 facing the printing section and having a support surface 22 for supporting the medium, a holding section 26 for holding the medium spanning across from the support section, a heating section 31 that is located downstream of the support section in the transport direction of the medium and that heats the printed medium, and a heat shield section 41 facing the heating section, wherein the heat shield section has a facing surface 43 that faces the heating section and that is separated from the medium extending across from the support section to the holding section, and a protruding section 46 that protrudes from the facing surface toward the heating section at an end portion on a downstream side in the transport direction.

7 Claims, 6 Drawing Sheets

PRINTING DEVICE

The present application is based on, and claims priority from JP Application Serial Number 2022-202191, filed Dec. 19, 2022, the disclosure of which is hereby incorporated by reference herein in its entirety.

BACKGROUND

1. Technical Field

The present disclosure relates to a printing device.

2. Related Art

JP-A-2020-138348 describes a printing device including a printing section that performs printing by ejecting liquid onto a medium, a support section that faces the printing section, a holding section that holds the medium spanning across from the support section, a heating section that heats the printed medium, and a heat shield section that faces the heating section. The medium passes between the heating section and the heat shielding section by spanning across from the support section and the holding section. The printing device dries the medium passing between the heating section and the heat shield section.

In the printing device described in JP-A-2020-138348, when the medium is set in the printing device, it is necessary to pass the medium between the heating section and the heat shield section. By feeding the medium so that it hangs down between the heating section and the heat shield section, the medium is guided along the heat shield section to the holding section. However, when the medium is guided along the heat shield section to the holding section, the leading end of the medium may enter a gap between the heat shield section and the holding section. Therefore, there is a problem that it is difficult to set the medium.

SUMMARY

A printing device according to solve the above problems includes a printing section that performs printing by ejecting a liquid onto a transported medium, a support section facing the printing section and having a support surface for supporting the medium, a holding section for holding the medium spanning across from the support section, a heating section that is located downstream of the support section in the transport direction of the medium and that heats the printed medium, and a heat shield section facing the heating section, wherein the heat shield section has a facing surface that faces the heating section and that is separated from the medium extending across from the support section to the holding section, and a protruding section that protrudes from the facing surface toward the heating section at an end portion on a downstream side in the transport direction.

DESCRIPTION OF EMBODIMENTS

An embodiment of the printing device will be described below with reference to the drawings. The printing device is, for example, an inkjet printer that records an image such as a character, a photograph, or a figure by ejecting ink which is an example of a liquid onto a medium such as fabric or sheet paper.

Printing Device

Figure 1:
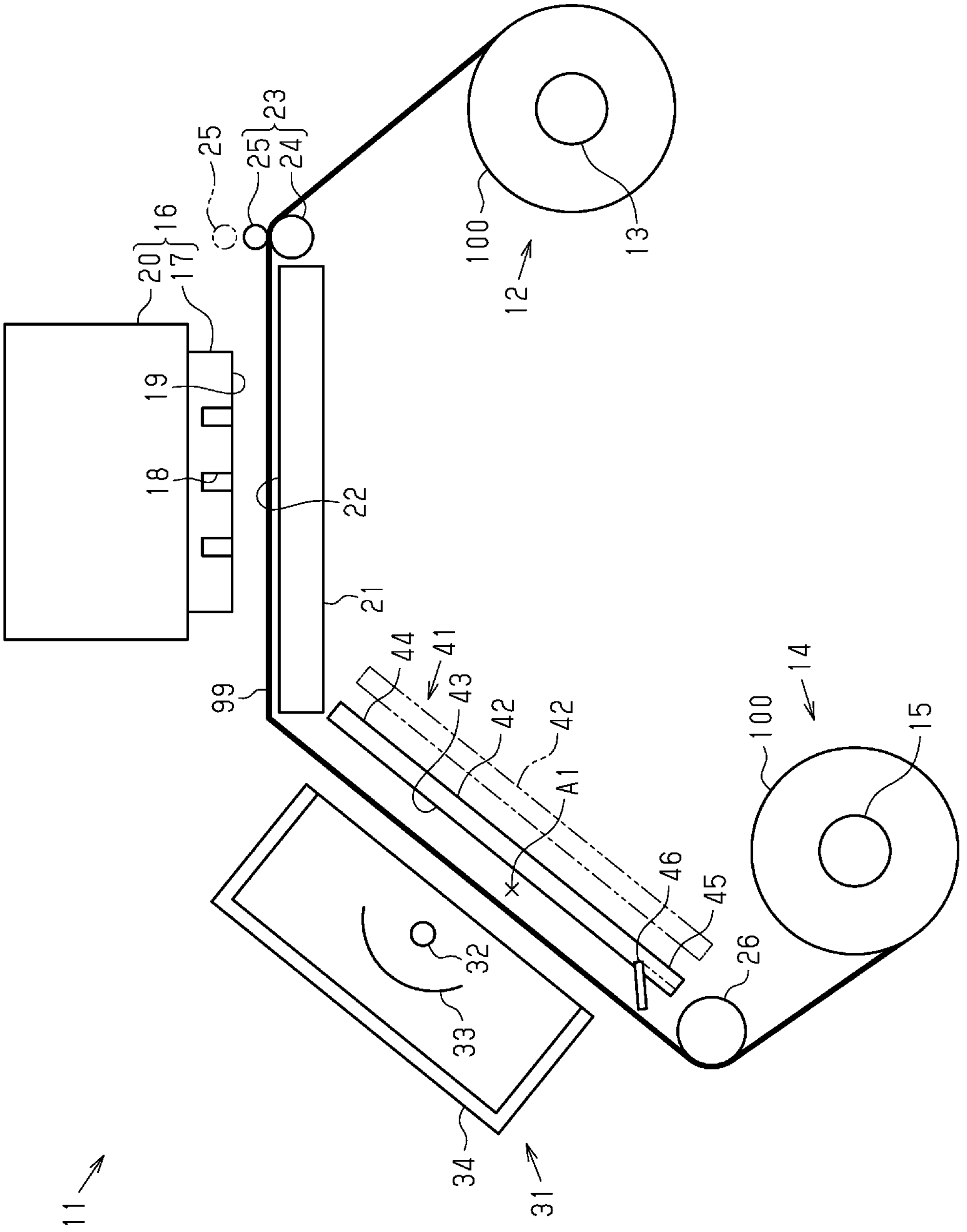
FIG. 1 is a side view showing an embodiment of a printing device.

As shown in FIG. 1, a printing device 11 includes a feeding section 12. The feeding section 12 is configured to feed a medium 99. The feeding section 12 has a feed shaft 13. The feed shaft 13 holds a roll body 100 on which the medium 99 before printing is wound. When the roll body 100 held by the feeding shaft 13 rotates, the medium 99 is fed from the feeding section 12. Therefore, the medium 99 is long fabric or sheet paper continuous from the roll body 100.

The printing device 11 includes a winding section 14. The winding section 14 is configured to wind up the medium 99. Specifically, the winding section 14 winds the medium 99 fed from the feeding section 12. The winding section 14 has a winding shaft 15. The winding shaft 15 holds the roll body 100 on which the medium 99 after printing is wound. When the roll body 100 held by the winding shaft 15 rotates, the medium 99 is wound around the winding section 14.

The printing device 11 includes a printing section 16. The printing section 16 is configured to print an image on the medium 99 by discharging a liquid onto the medium 99 that is transported. The printing section 16 prints an image on the medium 99 in a process from when the medium 99 is fed from the feeding section 12 to when the medium 99 is wound by the winding section 14.

The printing section 16 has a head 17. The head 17 has a nozzle surface 19 in which one or more nozzles 18 are opened. The head 17 ejects liquid from the nozzle 18.

The printing section 16 includes a carriage 20. The head 17 is mounted on the carriage 20.

The carriage 20 scans across the medium 99. As the carriage 20 scans, the head 17 can discharge liquid over the entire width of the medium 99. In this way, the printing device 11 is a so-called serial printer. The printing device 11 may be a line printer in which the head 17 can discharge liquid all at once across the width of the medium 99.

The printing device 11 includes a support section 21. The support section 21 supports the medium 99. More specifically, the support section 21 supports the medium 99 to be transported. The support section 21 supports the medium 99 from below. The support section 21 faces the printing section 16. Accordingly, the liquid is discharged from the printing section 16 to the region of the medium 99 supported by the support section 21.

The support section 21 has a support surface 22 that supports the medium 99. The support surface 22 is a surface facing the printing section 16. Specifically, the support surface 22 faces the nozzle surface 19. The support surface 22 is in contact with the medium 99. The support surface 22 faces upward, for example.

The printing device 11 includes a transport section 23. The transport section 23 is configured to transport the medium 99. The transport section 23 transports the medium 99 in the transport direction. The transport direction is a direction along the medium 99. The transport section 23 is located upstream of the support section 21 in the transport direction. The transport section 23 may be located downstream of the support section 21 in the transport direction.

The transport section 23 includes a first roller 24 and a second roller 25. The first roller 24 and the second roller 25 transport the medium 99 by rotating in a state of nipping the medium 99. For example, the first roller 24 contacts the medium 99 from below. The second roller 25 contacts the medium 99 from above.

The first roller 24 and the second roller 25 are configured to be switched between a state of nipping the medium 99 and a state of being separated from each other. For example, the second roller 25 is configured to displace relative to the first roller 24. Specifically, the second roller 25 moves toward and away from the first roller 24. For example, the second roller 25 is displaced to a position indicated by solid line and a position indicated by two dot chain line in FIG. 1. The state of the first roller 24 and the second roller 25 is switched by displacing the second roller 25. When the second roller 25 is located at the position indicated by solid line in FIG. 1, the first roller 24 and the second roller 25 nip the medium 99. When the second roller 25 is located at a position indicated by two dot chain line in FIG. 1, the first roller 24 and the second roller 25 are separated from each other. The second roller 25 is not limited to being displaced, and the first roller 24 may be displaced, or both may be displaced.

The states of the first roller 24 and the second roller 25 may be automatically switched. For example, the states of the first roller 24 and the second roller 25 may be switched in accordance with a printing operation. The first roller 24 and the second roller 25 may nip the medium 99 when a printing operation is started. The first roller 24 and the second roller 25 may be separated from each other when a printing operation is stopped. An example of start of printing operation is when a user gives a printing command to the printing device 11 by operating an operation section 61. Examples of when a printing operation is stopped are the timing when printing on the medium 99 is completed, the timing at which printing on the medium 99 is stopped due to an error, the timing at which transportation of the medium 99 is stopped due to an error, or the like.

The states of the first roller 24 and the second roller 25 may be manually switched. For example, the states of the first roller 24 and the second roller 25 are electrically or mechanically switched by a user operating the operation section 61 (to be described later). Electrically switching the state means, for example, switching the state based on an electric signal transmitted by operating the operation section 61. Mechanically switching the state means switching the state by a gear train coupled to the operation section 61, a link mechanism, or the like.

The printing device 11 includes a holding section 26. The holding section 26 is located downstream of the support section 21 in the transport direction. The holding section 26 is configured to hold the medium 99. The holding section 26 holds the medium 99 spanning across from the support section 21. Therefore, the holding section 26 holds the medium 99 after printing. The holding section 26 guides the medium 99 to the winding section 14.

The holding section 26 holds the medium 99, whereby the medium 99 spans across the support section 21 and the holding section 26. A portion of the medium 99 which spans across the support section 21 and the holding section 26 is positioned in midair in the printing device 11.

The holding section 26 holds the medium 99 by the medium 99 between the support section 21 and the winding section 14 winding around the holding section 26. The holding section 26 is formed of a guide bar around which the medium 99 winds. For example, the holding section 26 may hold the medium 99 by nipping the medium 99 in the same manner as the transport section 23. That is, the holding section 26 may be configured by a pair of rollers that nip the medium 99.

The holding section 26 may adjust the tension applied to the medium 99. When the winding speed of the winding section 14 is high, a relatively large tension is applied to the medium 99. In this case, the printing quality may deteriorate because of wrinkles in the medium 99. Therefore, the holding section 26 may be displaced so as to reduce the tension applied to the medium 99. When the winding speed of the winding section 14 is low, a relatively small tension is applied to the medium 99. In this case, there is a risk that the printing quality may deteriorate due to the medium 99 becoming slack. Therefore, the holding section 26 may be displaced so as to increase the tension applied to the medium 99. As described above, the holding section 26 may be configured by a tension bar that adjusts tension applied to the medium 99.

The printing device 11 includes a heating section 31. The heating section 31 is configured to heat the medium 99. The heating section 31 heats the printed medium 99. The heating section 31 is positioned downstream of the support section 21 in the transport direction. Specifically, the heating section 31 is positioned between the support section 21 and the holding section 26 in the transport direction. Therefore, the heating section 31 heats a portion of the medium 99 which is positioned between the support section 21 and the holding section 26. That is, the heating section 31 heats a portion of the medium 99 which spans across the support section 21 and the holding section 26. The heating section 31 dries the medium 99 by heating the medium 99. Accordingly, since the liquid is easily fixed to the medium 99, the printing quality of the medium 99 is improved.

The heating section 31 includes a heating element 32. The heating element 32 heats the medium 99. The heating element 32 is, for example, an infrared heater.

The heating section 31 may have a reflector plate 33. The reflector plate 33 reflects infrared rays radiated from the heating element 32 toward the medium 99. Thus, the heating efficiency of the heating element 32 is improved.

The heating section 31 includes a heating case 34. The heating case 34 houses the heating element 32.

The heating case 34 houses the reflector plate 33. The heating case 34 opens toward the medium 99.

The printing device 11 is provided with a heat shield section 41. The heat shield section 41 is located downstream of the support section 21 in the transport direction. More specifically, the heat shield section 41 is located between the support section 21 and the holding section 26 in the transport direction. The heat shield section 41 faces the heating section 31. Thus, the heat shield section 41 blocks the heat generated by the heating section 31. The medium 99 passes between the heating section 31 and the heat shield section 41. The heat generated from the heating section 31 is blocked by the heat shield section 41, and thus the medium 99 is effectively heated. The heat shield section 41 blocks heat generated from the heating section 31, thereby reducing the risk of heat being applied to elements other than the medium 99.

The heat shield section 41 has a heat shield plate 42. The heat shield plate 42 is formed of metal plate. The heat shield plate 42 has a facing surface 43 facing the heating section 31. The heat shield plate 42 has an upstream end section 44 and a downstream end section 45. The upstream end section 44 is an end portion located upstream of the heat shield plate 42 in the transport direction. The upstream end section 44 is located near the support section 21. The downstream end section 45 is an end portion located downstream of the heat shield plate 42 in the transport direction. The downstream end section 45 is positioned in the vicinity of the holding section 26.

The heat shield plate 42 is positioned so as to extend along the portion of the medium 99 spanning across from the support section 21 to the holding section 26. The heat shield plate 42 extends in parallel to the portion of the medium 99 spanning across from the support section 21 to the holding section 26. For example, the heat shield plate 42 extends obliquely downward from the upstream end section 44 toward the downstream end section 45.

The heat shield plate 42 is positioned so as to be separated from the portion of the medium 99 spanning across from the support section 21 to the holding section 26. Specifically, the facing surface 43 is separated from the portion of the medium 99 spanning across from the support section 21 to the holding section 26. Therefore, a cavity A1 is formed between the heat shield plate 42 and the medium 99. Since the cavity A1 is secured between the heat shield plate 42 and the medium 99, dew condensation does not easily occur on the heat shield plate 42.

The liquid evaporates from the medium 99 by the heating section 31 heating the medium 99. The liquid includes a solvent such as water or a solution. Therefore, when the heating section 31 heats the medium 99, vapor is generated around the medium 99. If the heat shield plate 42 were in contact with the medium 99, condensation is likely to occur on the heat shield plate 42 due to the vapor generated from the medium 99. This is because the likelihood of dew condensation occurring in the heat shield plate 42 is determined by the saturation vapor amount between the heat shield plate 42 and the medium 99. That is, by securing the cavity A1, the saturation vapor amount between the heat shield plate 42 and the medium 99 increases. This makes it difficult for dew condensation to occur on the heat shield plate 42. The more the volume of the cavity A1 increases, the less likely that condensation is to occur on the heat shield plate 42. When condensation occurs on the heat shield plate 42, there may be a risk that the condensed liquid drips from the heat shield plate 42 onto the floor surface or adhere to the medium 99.

The heat shield section 41 has a protruding section 46. The protruding section 46 protrudes from the facing surface 43 toward the heating section 31. The protruding section 46 protrudes from the heat shield plate 42. The protruding section 46 is positioned at the downstream end of the heat shield section 41 in the transport direction. Specifically, the protruding section 46 is located at the downstream end section 45 in the transport direction.

Figure 2:
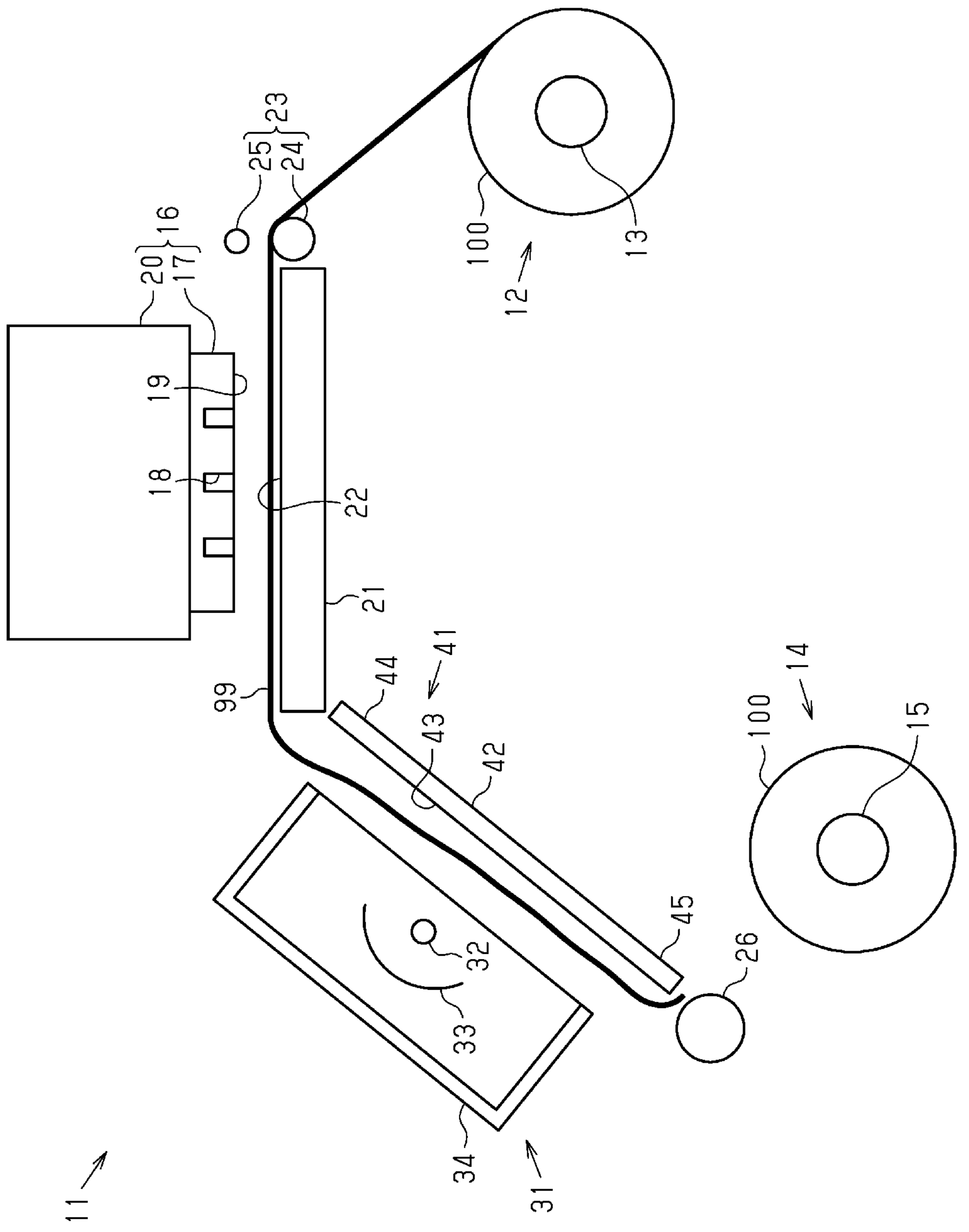
FIG. 2 is a side view showing a comparative example in which a heat shield section does not have a protruding section.

As shown in FIG. 2, when the medium 99 is being set, the medium 99 needs to pass between the heating section 31 and the heat shielding section 41. When setting the medium 99, the user inserts the medium 99 between the heating section 31 and the heat shield section 41 by hanging the medium 99 down from the support section 21. The medium 99 passes between the heating section 31 and the heat shield section 41 by sliding down on the facing surface 43 along the heat shield plate 42. In this way, the medium 99 is set by the heat shield section 41 guiding the medium 99. However, since the cavity A1 is formed between the heat shield section 41 and the medium 99, the medium 99 may slide down along the heat shield plate 42 and the leading end of the medium 99 may enter between the heat shield section 41 and the holding section 26.

Figure 3:
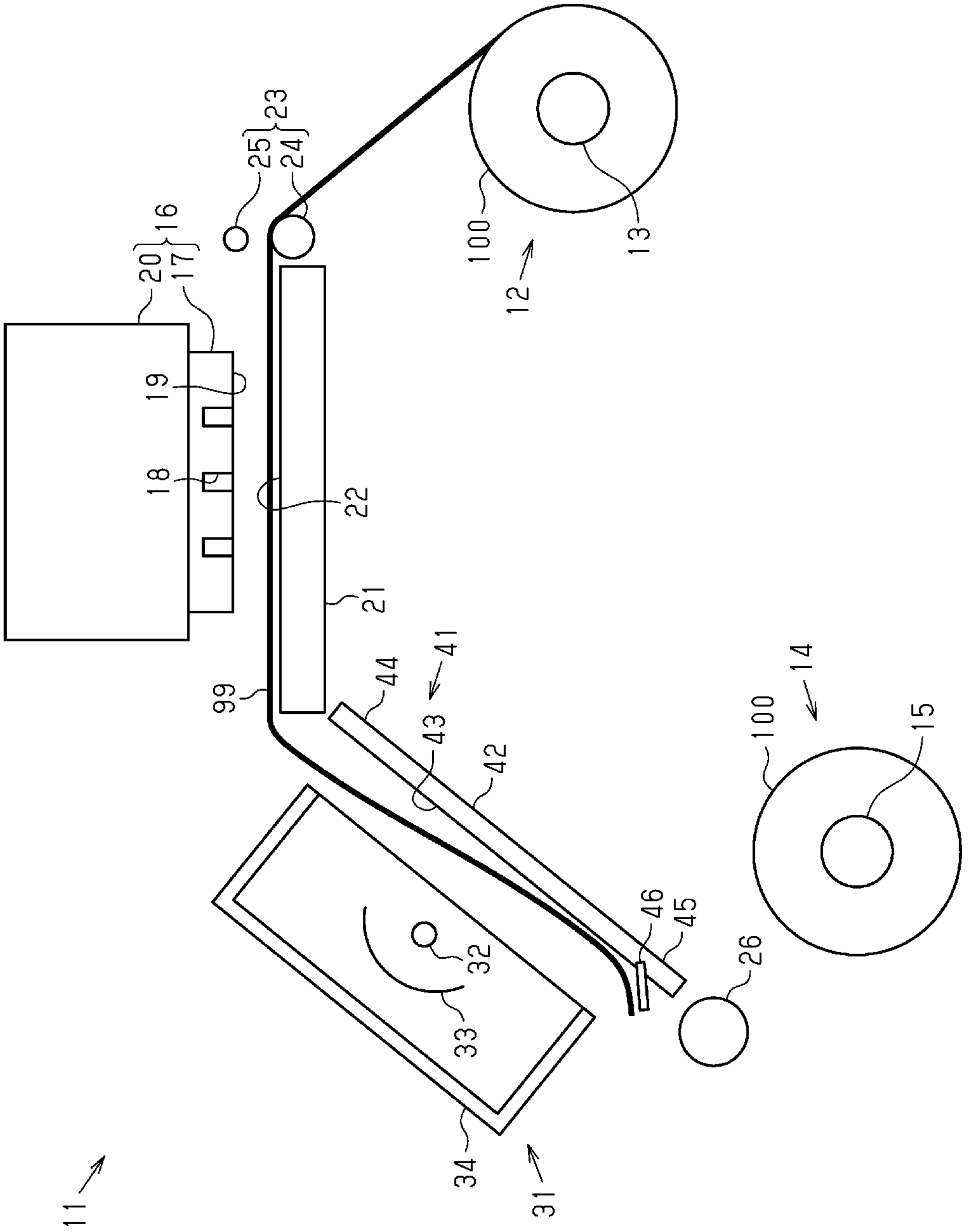
FIG. 3 is a side view when the protruding section guides the medium.

As shown in FIG. 3, the protruding section 46 scoops up the leading end of the medium 99 guided by the heat shield plate 42. That is, the protruding section 46 lifts the leading end of the medium 99 sliding down on the facing surface 43 toward the holding section 26. Accordingly, when the medium 99 is set, the risk that the leading end of the medium 99 enters between the heat shield section 41 and the holding section 26 is reduced. Therefore, it is easy to set the medium 99.

The protruding section 46 preferably protrudes from the facing surface 43 so as to be gently inclined or curved. In this way, the leading end of the medium 99 is easily guided to the holding section 26. The protruding section 46 may protrude perpendicularly from the facing surface 43, for example. In this case, the protruding section 46 can reduce the risk that the leading end of the medium 99 enters between the heat shield section 41 and the holding section 26. Therefore, the medium 99 is easily set compared to when the leading end of the medium 99 enters between the heat shield section 41 and the holding section 26.

When the protruding section 46 protrudes from the facing surface 43, the air permeability of the cavity A1 may be reduced. When the air permeability of the cavity A1 is low, vapor tends to accumulate in the cavity A1. Therefore, if the air permeability of the cavity A1 is low, dew condensation is likely to occur in the heat shield section 41. Therefore, in order to suppress dew condensation, in addition to increasing the volume of the cavity A1, it is also conceivable to improve the ventilation of the cavity A1.

Figure 4:
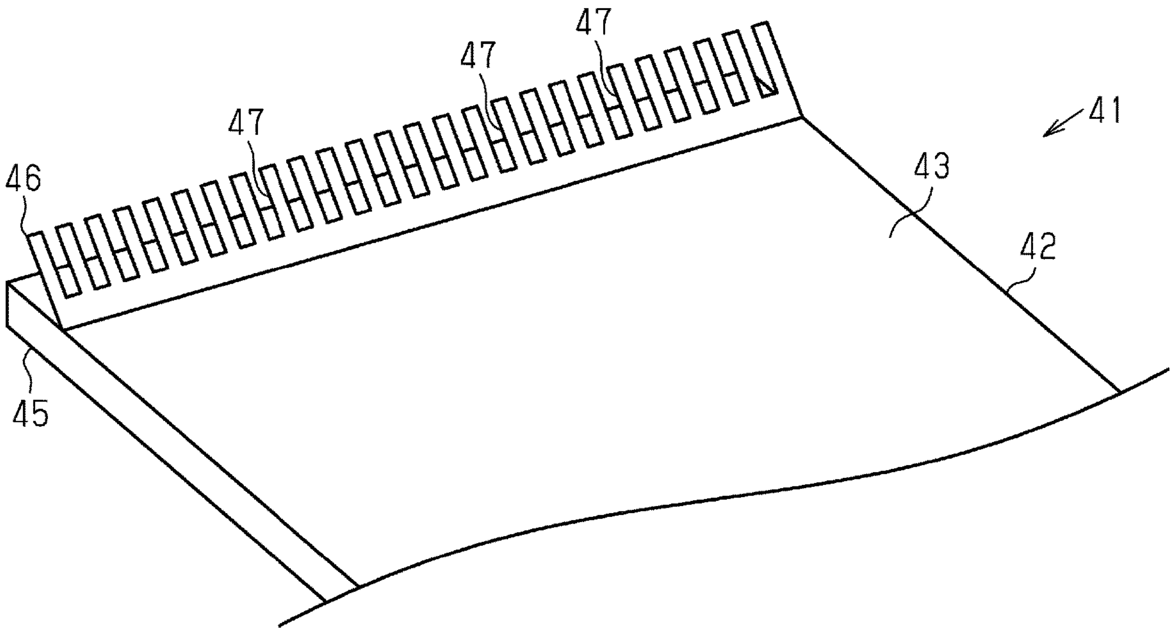
FIG. 4 is a perspective view showing an example of the protruding section.

As shown in FIG. 4, one or more slits 47 may be formed in the protruding section 46.

That is, the protruding section 46 may be formed in a comb-like shape. When the slits 47 are formed in the protruding section 46, air permeability of the cavity A1 is improved as compared with the case where no the slits 47 are formed in the protruding section 46. As a result, condensation is less likely to occur on the heat shield section 41.

Figure 5:
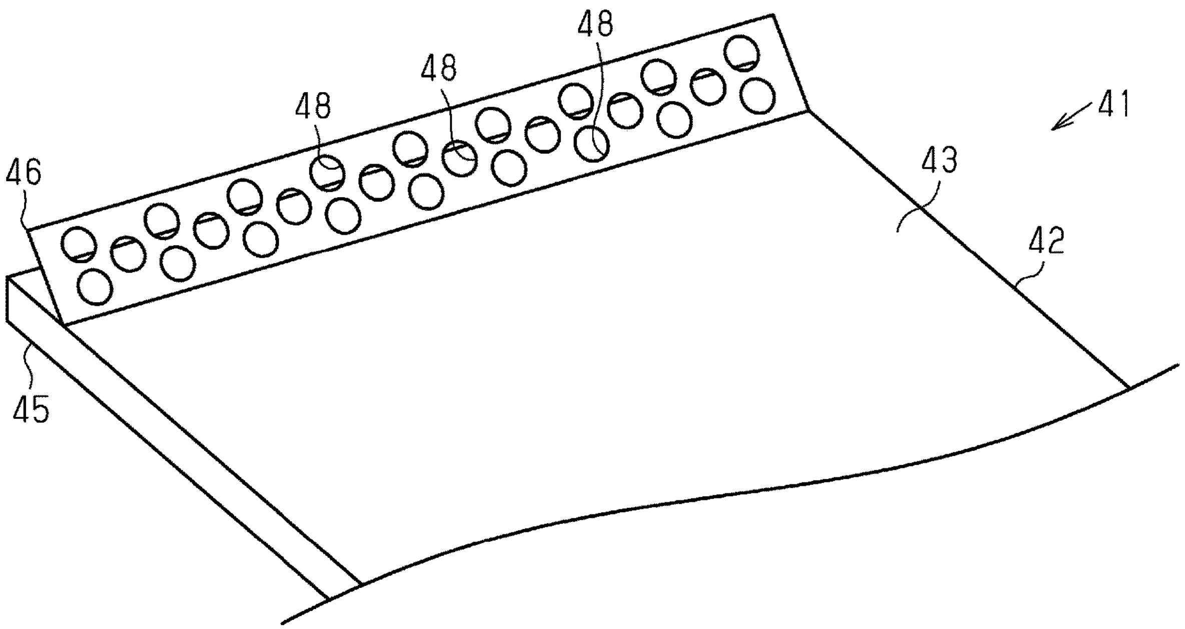
FIG. 5 is a perspective view showing another example of the protruding section.

As shown in FIG. 5, one or more through holes 48 may be opened in the protruding section 46. When the through holes 48 are opened in the protruding section 46, the air permeability of the cavity A1 is improved compared to when no through holes 48 are opened in the protruding section 46. As a result, condensation is less likely to occur on the heat shield section 41.

Figure 6:
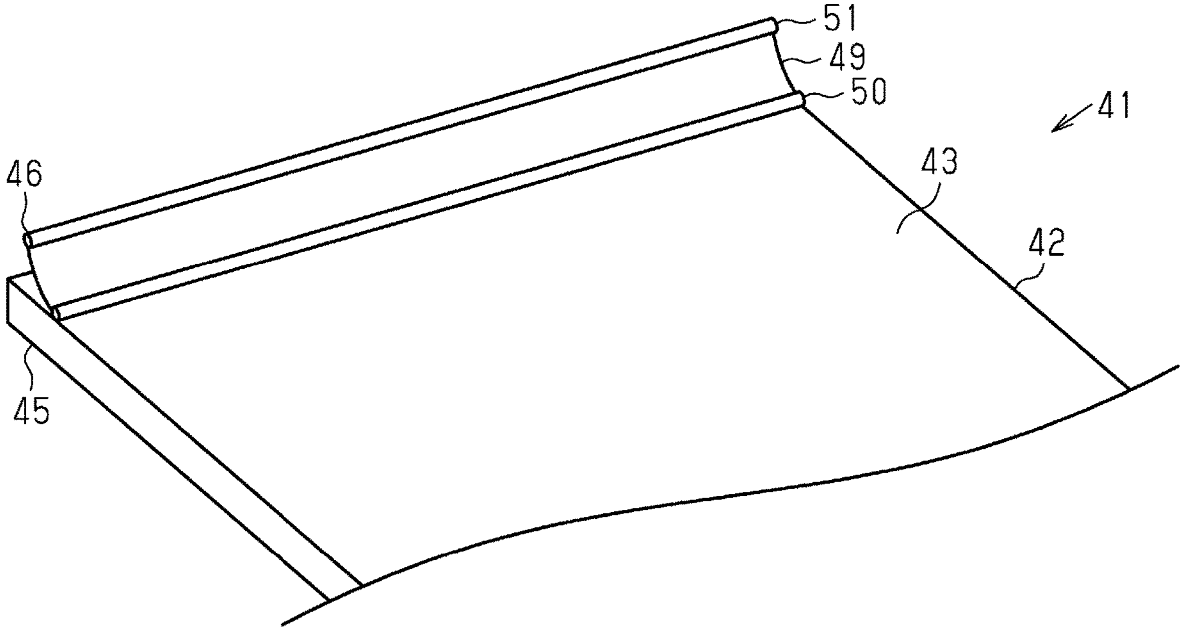
FIG. 6 is a perspective view showing another example of the protruding section different from that of FIG. 5.

As shown in FIG. 6, the protruding section 46 may be made of fabric 49. For example, the protruding section 46 may include the fabric 49, a first shaft 50 that holds the fabric 49, and a second shaft 51 that holds the fabric 49. The first shaft 50 is located on the facing surface 43. The second shaft 51 is located farther from the facing surface 43. The fabric 49 spans between the first shaft 50 and the second shaft 51. In this case, the cavity A1 is ventilated through the fabric 49. Therefore, when the protruding section 46 is formed of the fabric 49, the air permeability of the cavity A1 is improved as compared with the case where the protruding section 46 is formed of resins, metals, or the like. As a result, condensation is less likely to occur on the heat shield section 41.

Figure 7:
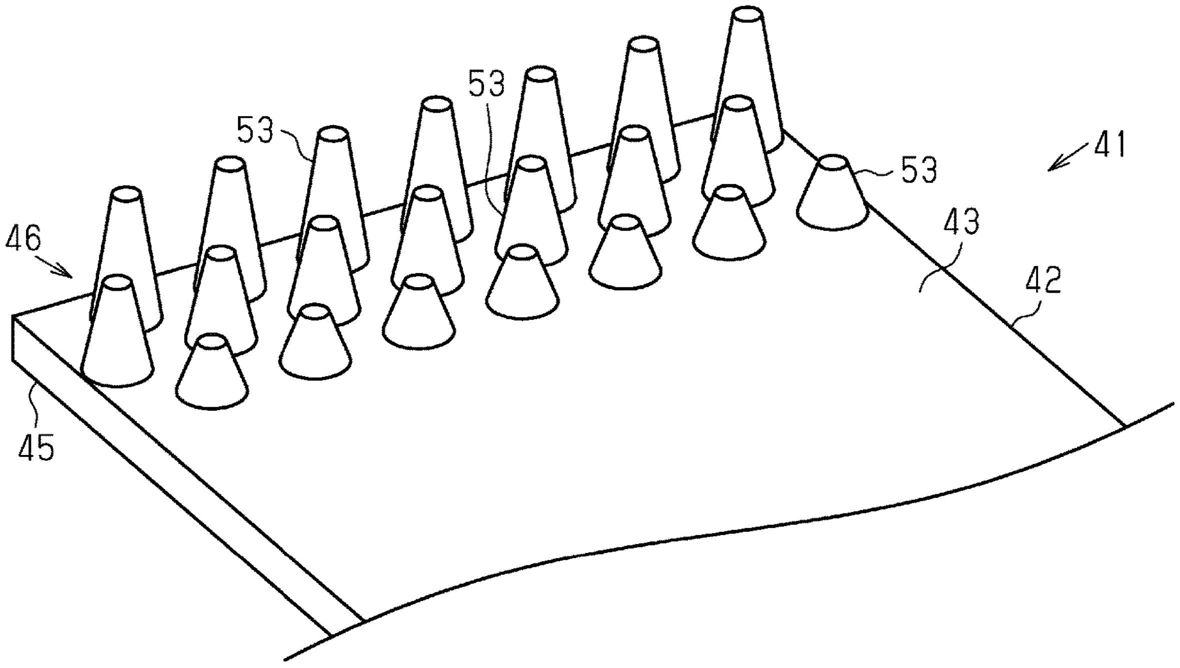
FIG. 7 is a perspective view showing another example of a protruding section different from those of FIGS. 5 and 6.

As shown in FIG. 7, the protruding section 46 may be constituted by a plurality of protrusions 53. For example, the protrusions 53 extend in a circular truncated cone shape. The plurality of protrusions 53 protrude from the facing surface 43. The plurality of protrusions 53 is arranged over the entire width of the heat shield plate 42. The plurality of protrusions 53 are arranged in the transport direction. Of the plurality of protrusions 53, the protruding amount of protrusions 53 located downstream in the transport direction is preferably larger than the protruding amount of protrusions 53 located upstream in the transport direction. This makes it easy for the protruding section 46 to scoop up the leading end of the medium 99.

As shown in FIG. 1, the protruding section 46 may be configured to be displaced to a position where it protrudes from the facing surface 43 and a position where it is housed in the heat shield section 41. The protruding section 46 is, for example, a flap. The protruding section 46 is displaced, for example, by rotating about its proximal end. The protruding section 46 protrudes from the facing surface 43 when located at a position indicated by solid line in FIG. 1. The protruding section 46 is housed when it is located at a position indicated by two dot chain line in FIG. 1. For example, the protruding section 46 is housed in the heat shield plate 42. When housed, the protruding section 46 does not protrude from the facing surface 43.

When the protruding section 46 protrudes from the facing surface 43, the volume of the cavity A1 is considerably smaller than when the protruding section 46 does not protrude from the facing surface 43. Further, when the protruding section 46 protrudes from the facing surface 43, the air permeability of the cavity A1 decreases as compared to when the protruding section 46 does not protrude from the facing surface 43. Therefore, when the protruding section 46 protrudes from the facing surface 43, dew condensation is more likely to occur in the heat shield section 41 than when the protruding section 46 does not protrude from the facing surface 43.

When the medium 99 is set, the protruding section 46 is located at a position protruding from the facing surface 43, and thus the medium 99 can be easily set. At the time of printing, since the protruding section 46 is located at a position where it does not protrude from the facing surface 43, dew condensation is less likely to occur in the heat shield section 41. In this way, by configuring the state of the protruding section 46 to be variable, it is possible to make it difficult for dew condensation to occur on the heat shield section 41 while ensuring ease of setting the medium 99.

The protruding section 46 may be manually displaced by user operation. The protruding section 46 may be displaced by, for example, the user operating the operation section 61. The protruding section 46 may be displaced, for example, by a user touching the protruding section 46.

The protruding section 46 may be automatically displaced by the control of the printing device 11. The protruding section 46 may be automatically housed, for example, when the printing operation is started. The protruding section 46 may be automatically protruded, for example, when the printing operation is stopped.

The protruding section 46 may be interlocked with the states of the first roller 24 and the second roller 25, for example. When the first roller 24 and the second roller 25 nip the medium 99, the protruding section 46 may be housed. When the first roller 24 and the second roller 25 are separated from each other, the protruding section 46 may protrude from the facing surface 43.

The protruding section 46 may be displaced such that the protruding amount thereof is changed in multiple stages. For example, the protruding amount of the protruding section 46 is changed in multiple stages by changing the elevation angle of the protruding section 46 in multiple stages. For example, the protruding amount of the protruding section 46 may be changed according to the type of the medium 99 so that the protruding section 46 can easily guide the medium 99 to the holding section 26.

Electrical Configuration

Next, an electrical configuration of the printing device 11 will be described.

Figure 8:
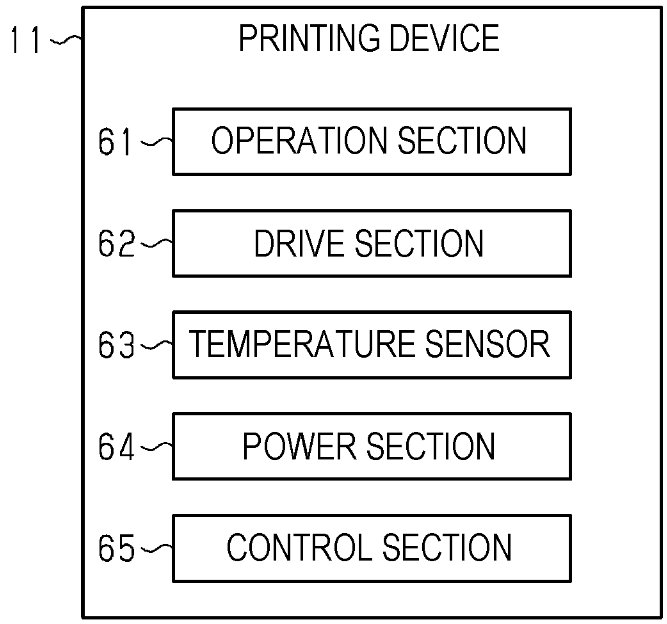
FIG. 8 is a block diagram showing electrical configuration of the printing device.

As shown in FIG. 8, the printing device 11 includes the operation section 61. The operation section 61 is a configuration for operating the printing device 11. The user operates the printing device 11 via the operation section 61. The operation section 61 is, for example, a touch panel. The operation section 61 may be a button, a lever, a switch, or the like. The user causes the printing device 11 to start a printing operation by operating the operation section 61. The user may displace the protruding section 46 by operating the operation section 61.

The printing device 11 may include a drive section 62. The drive section 62 is configured to drive the protruding section 46. The drive section 62 includes, for example, a motor. By driving the protruding section 46, the drive section 62 displaces the protruding section 46 to a position where the protruding section 46 protrudes from the facing surface 43 and a position where the protruding section 46 is housed. The drive section 62 changes the protruding amount of the protruding section 46 by driving the protruding section 46. The drive section 62 may house the protruding section 46 when the printing device 11 starts a printing operation. The drive section 62 may cause the protruding section 46 to protrude from the facing surface 43 when the printing device 11 stops the printing operation.

The printing device 11 may include a temperature sensor 63. The temperature sensor 63 is a sensor that detects the temperature of outside air. That is, the temperature sensor 63 detects the temperature of the environment in which the printing device 11 is installed. When the temperature of the outside air is low, dew condensation easily occurs. This is because the saturation vapor amount in the air decreases when the temperature of the outside air is low. By the temperature sensor 63, the printing device 11 and the user can grasp whether or not the environment is an environment in which dew condensation easily occurs in the heat shield section 41.

The printing device 11 may include a power section 64. The power section 64 is configured to displace the heat shield section 41. Specifically, the power section 64 displaces the heat shield plate 42. The power section 64 includes, for example, a motor. The power section 64 moves the heat shield plate 42 closer to or away from the heating section 31. Thus, the distance between the heat shield plate 42 and the heating section 31 changes. As a result, the volume of the cavity A1 changes. That is, the volume of the cavity A1 decreases as the heat shield plate 42 approaches the heating section 31. When the heat shield plate 42 is separated from the heating section 31, the volume of the cavity A1 increases. In this way, the saturation vapor amount in the cavity A1 can be changed by the power section 64 displacing the position of the heat shield plate 42. Therefore, for example, in an environment in which dew condensation easily occurs on the heat shield plate 42, for example, when the temperature of the outside air is low, the power section 64 may displace the heat shield section 41 so as to be separated from the heating section 31.

The printing device 11 includes a control section 65. The control section 65 controls various configurations of the printing device 11. The control section 65 controls, for example, the feeding section 12, the winding section 14, the printing section 16, the transport section 23, the heating section 31, the drive section 62, the power section 64, and the like.

The control section 65 may be configured with one or more processors that execute various processes according to a computer program. The control section 65 may be configured by one or more dedicated hardware circuits such as an ASIC that executes at least a part of various processes. The control section 65 may be constituted by a circuit including a combination of a processor, a hardware circuit, and the like. The processor includes a CPU and a memory such as RAM and ROM. The memory stores program code or commands configured to cause the CPU to perform the processing. The memory, that is, the computer readable medium, includes any readable media that can be accessed by a general purpose or dedicated computer.

As shown in FIG. 1, the control section 65 controls the power section 64 to displace the heat shield section 41 between a position indicated by solid line and a position indicated by two dot chain line. When the heat shield section 41 is located at the position indicated by solid line, the distance between the heat shield section 41 and the heating section 31 is smaller than when the heat shield section 41 is located at the position indicated by two dot chain line. The control section 65 displaces the heat shield section 41 based on the detection result of the temperature sensor 63. When the outside air temperature is low, the control section 65 displaces the heat shield section 41 so that the distance between the heat shield section 41 and the heating section 31 increases.

As a result, condensation is less likely to occur on the heat shield section 41.

When the distance between the heat shield section 41 and the heating section 31 increases due to the displacement of the heat shield section 41, there is a risk that the medium 99 cannot be guided to the holding section 26 by the protruding section 46. That is, when the distance between the heat shield section 41 and the heating section 31 increases, there is a risk that the protruding amount of the protruding section 46 will be insufficient.

The control section 65 may control the drive section 62 based on the distance between the heat shield section 41 and the heating section 31. That is, the control section 65 may change the protruding amount of the protruding section 46 based on the distance between the heat shield section 41 and the heating section 31. The control section 65 acquires the distance between the heat shield section 41 and the heating section 31 from, for example, an encoder included in the power section 64. When the distance between the heat shield section 41 and the heating section 31 is large, the control section 65 increases the protruding amount of the protruding section 46 compared to when the distance between the heat shield section 41 and the heating section 31 is small. By this, the protruding section 46 can appropriately guide the medium 99 to the holding section 26 in accordance with the distance between the heat shield section 41 and the heating section 31.

The control section 65 may bring the heat shield section 41 close to the heating section 31 when the medium 99 is set.

By this, the protruding section 46 can appropriately guide the medium 99 to the holding section 26 without changing the protruding amount of the protruding section 46. The control section 65 may separate the heat shield section 41 from the heating section 31 during printing. By this, the volume of the cavity A1 is increased during printing, so that dew condensation is less likely to occur in the heat shield section 41.

Operations and Effects

Next, operations and effects of the above embodiment will be described.

(1) The heat shield section 41 has a protruding section 46 projecting from the facing surface 43 toward the heating section 31 at the downstream end section 45. According to the above configuration, when the medium 99 is set in the printing device 11, by the medium 99 being fed so as to hang down between the heating section 31 and the heat shield section 41, the medium 99 is lifted by the protruding section 46 so as to approach the heating section 31. This reduces the risk that the leading end of the medium 99 enters between the heat shield section 41 and the holding section 26. Therefore, the medium 99 can be set easily.

(2) The protruding section 46 is configured to be displaced between a position protruding from the facing surface 43 toward the heating section 31 and a position housed in the heat shield section 41.

The liquid evaporates from the medium 99 by the heating section 31 heating the medium 99. The vapor evaporated from the medium 99 tends to stay between the medium 99 and the heat shield section 41. Therefore, there is a risk that the vapor evaporated from the medium 99 will condense on the heat shield section 41.

The cavity A1 is formed between the medium 99 and the facing surface 43 by the medium 99 spanning across from the support section 21 to the holding section 26. The larger the cavity A1, the greater the saturation vapor amount, and thus the risk of the liquid evaporated from the medium 99 condensing on the heat shield section 41 decreases.

According to the above configuration, the displacement of the protruding section 46 increases or decreases the volume generated in the cavity A1 between the medium 99 and the heat shield section 41. When the protruding section 46 protrudes from the facing surface 43, the volume of the cavity A1 is smaller than that when the protruding section 46 is housed. In this case, since the saturation vapor amount in the cavity A1 decreases, the liquid evaporated from the medium 99 tends to condense on the heat shield section 41. Therefore, for example, when the medium 99 is set, the heat shield section 41 can guide the medium 99 to the holding section 26 by causing the protruding section 46 to protrude from the facing surface 43. For example, in the case of heating the medium 99, the protruding section 46 is housed so that the liquid evaporated from the medium 99 is less likely to condense on the heat shield section 41. In addition, by housing the protruding section 46, the cavity A1 is easily ventilated. As a result, the liquid evaporated from the medium 99 is less likely to condense on the heat shield section 41.

(3) The protruding section 46 is formed by a plurality of protrusions 53.

The liquid evaporates from the medium 99 by the heating section 31 heating the medium 99. The vapor evaporated from the medium 99 tends to stay between the medium 99 and the heat shield section 41. Therefore, there is a risk that the vapor evaporated from the medium 99 will condense on the heat shield section 41.

According to the above-described configuration, the cavity A1 between the medium 99 and the heat shield section 41 is easily ventilated through the gaps between the plurality of protrusions 53. Therefore, the risk that the vapor evaporated from the medium 99 will condense on the heat shield section 41 is reduced.

(4) The control section 65 causes the protruding section 46 to protrude from the facing surface 43 when the printing operation starts, and houses the protruding section 46 when the printing operation stops.

According to the above-described configuration, since the protruding section 46 is automatically displaced in accordance with the printing operation, user convenience is improved compared to when the user manually displaces the protruding section 46.

(5) The power section 64 displaces the heat shield section 41 so as to change the distance between the heating section 31 and the heat shield section 41 based on the outside air temperature measured by the temperature sensor 63.

According to the above configuration, the volume of the cavity A1 is changed by displacing the heat shield section 41. For example, when the outside air temperature is low, the saturation vapor amount of the air decreases. Therefore, when the outside air temperature is low, the vapor evaporated from the medium 99 is more likely to condense on the heat shield section 41. Therefore, when the outside air temperature is low, by displacing the heat shield section 41 so as to increase the distance between the heating section 31 and the heat shield section 41, the vapor evaporated from the medium 99 is less likely to condense on the heat shield section 41.

(6) The drive section 62 changes the protruding amount of the protruding section 46 based on the distance between the heating section 31 and the heat shield section 41.

When the medium 99 is set, if the distance between the heating section 31 and the heat shield section 41 is large, the leading end of the medium 99 can easily enter the gap between the heat shield section 41 and the holding section 26. Therefore, for example, by increasing the protruding amount of the protruding section 46 in accordance with increase in the distance between the heating section 31 and the heat shield section 41, the leading end of the medium 99 is less likely to enter the gap between the heat shield section 41 and the holding section 26. Therefore, according to the above configuration, even when the distance between the heating section 31 and the heat shield section 41 is changed, the medium 99 can be guided to the holding section 26 by the protruding section 46.

When the medium 99 is set, if the distance between the heating section 31 and the heat shield section 41 is large, the leading end of the medium 99 can easily enter the gap between the heat shield section 41 and the holding section 26. Therefore, for example, by increasing the protruding amount of the protruding section 46 in accordance with increase in the distance between the heating section 31 and the heat shield section 41, the leading end of the medium 99 is less likely to enter the gap between the heat shield section 41 and the holding section 26. Therefore, according to the above configuration, even when the distance between the heating section 31 and the heat shield section 41 is changed, the medium 99 can be guided to the holding section 26 by the protruding section 46.

(7) The protruding section 46 is formed by the fabric 49.

According to the above configuration, the cavity A1 between the medium 99 and the heat shield section 41 is ventilated through the fabric 49. Therefore, the risk that the vapor evaporated from the medium 99 will condense on the heat shield section 41 is reduced.

Modifications

The above embodiments may be modified as follows. The above embodiments and the following modifications can be implemented in combination with each other to the extent that there is no technical contradiction.

The heat shield plate 42 may be displaced by the user contacting it directly.

The liquid ejected by the head 17 is not limited to ink, and may be, for example, a liquid material in which particles of a functional material are dispersed in or mixed with a liquid. For example, the head 17 may eject a liquid material containing a material, in a dispersed or dissolved form, such as an electrode material or a pixel material used for manufacturing liquid crystal displays, electroluminescence displays, or surface light emission displays.

Technical Ideas

Hereinafter, technical ideas grasped from the above-described embodiment and modifications, and operations and effects thereof, will be described.

(A) A printing device includes a printing section that performs printing by ejecting a liquid onto a transported medium, a support section facing the printing section and having a support surface for supporting the medium, a holding section for holding the medium spanning across from the support section, a heating section that is located downstream of the support section in the transport direction of the medium and that heats the printed medium, and a heat shield section facing the heating section, wherein the heat shield section has a facing surface that faces the heating section and that is separated from the medium extending across from the support section to the holding section, and a protruding section that protrudes from the facing surface toward the heating section at an end portion on a downstream side in the transport direction.

According to the above configuration, when the medium is to be set in the printing device, by the medium being fed so as to hang down between the heating section and the heat shielding section, the medium is lifted by the protruding section so as to approach the heating section. By this, the risk that the leading end of the medium will enter between the heat shield section and the holding section is reduced. Therefore, the medium can be easily set.

(B) In the printing device, the protruding section may be configured to be displaced between a position protruding from the facing surface toward the heating section and a position housed in the heat shield section.

The liquid is evaporated from the medium by the heating section heating the medium. The vapor evaporated from the medium tends to stay between the medium and the heat shield section. Therefore, there is a risk that vapor evaporated from the medium condenses on the heat shield section.

A cavity is formed between the medium and the facing surface by the medium spanning across from the support section to the holding section. The larger the cavity, the larger the saturation vapor amount, so the risk that the liquid evaporated from the medium will condense on the heat shield section is reduced.

According to the above configuration, the displacement of the protruding section increases or decreases the volume generated in the cavity between the medium and the heat shield section. When the protruding section protrudes from the facing surface, the volume of the cavity is smaller than when the protruding section is housed. In this case, since the saturation vapor amount in the cavity decreases, the liquid evaporated from the medium will tend to condense on the heat shield section. Therefore, for example, when the medium is set, the heat shield section can guide the medium to the holding section by causing the protruding section to protrude from the facing surface. Also, for example, by housing the protruding section when heating the medium, the liquid evaporated from the medium is less likely to condense on the heat shielding section.

(C) In the printing device, the protruding section is configured by a plurality of protrusions.

The liquid is evaporated from the medium by the heating section heating the medium. The vapor evaporated from the medium tends to stay between the medium and the heat shield section. Therefore, there is a risk that vapor evaporated from the medium condenses on the heat shield section. According to the above configuration, the cavity between the medium and the heat shield section is easily ventilated through the gaps between the plurality of protrusions. Therefore, the risk that the vapor evaporated from the medium will condense on the heat shielding section is reduced.

(D) The above-described printing device may include a drive section configured to drive the protruding section and a control section configured to control the drive section, wherein the control section causes the protruding section to protrude from the facing surface when a printing operation is started and causes the protruding section to be housed when the printing operation is stopped. According to the configuration, since the protruding section is automatically displaced in accordance with the printing operation, the convenience of the user is improved compared to when the user manually displaces the protruding section.

(E) The above-described printing device may further include a temperature sensor configured to measure the outside air temperature and a power section configured to displace the heat shield section, wherein the power section displaces the heat shield section so as to change the distance between the heating section and the heat shield section based on the temperature of the outside air measured by the temperature sensor.

According to the above configuration, the volume of the cavity is changed by displacing the heat shield section. For example, when the outside air temperature is low, the saturation vapor amount of the air decreases. Therefore, when the outside air temperature is low, the vapor evaporated from the medium is likely to condense on the heat shield section. Therefore, when the outside air temperature is low, by displacing the heat shield section so as to increase the distance between the heating section and the heat shield section, the vapor evaporated from the medium is less likely to condense on the heat shield section.

(F) The above-described printing device may further include a drive section configured to change a protruding amount of the protruding section, wherein the drive section changes the protruding amount of the protruding section based on the distance between the heating section and the heat shield section. When the medium is set, if the distance between the heating section and the heat shield section is great, the leading end of the medium is likely to enter the gap between the heat shield section and the holding section. Therefore, for example, by increasing the protruding amount of the protruding section as the distance between the heating section and the heat shield section increases, the leading end of the medium is less likely to enter the gap between the heat shield section and the holding section. Therefore, according to the above configuration, even when the distance between the heating section and the heat shield section is changed, the medium can be guided to the holding section by the protruding section.

(G) In the printing device, the protruding section may be formed of fabric.

According to the above configuration, the cavity between the medium and the heat shield section is ventilated through the fabric. Therefore, the risk that the vapor evaporated from the medium will condense on the heat shielding section is reduced.

What is claimed is:

1. A printing device comprising:

a printing section that performs printing by ejecting a liquid onto a transported medium;

a support section facing the printing section and having a support surface for supporting the medium;

a holding section for holding the medium spanning across from the support section;

a heating section that is located downstream of the support section in the transport direction of the medium and that heats the printed medium; and a heat shield section facing the heating section, wherein the heat shield section includes a facing surface that faces the heating section and that is separated from the medium extending across from the support section to the holding section, and a protruding section that protrudes from the facing surface toward the heating section at an end portion on a downstream side in the transport direction.

2. The printing device, according to claim 1, wherein the protruding section is configured to be displaced between a position protruding from the facing surface toward the heating section and a position housed in the heat shield section.

3. The printing device, according to claim 1, wherein the protruding section is configured by a plurality of protrusions.

4. The printing device, according to claim 2, further comprising:

a drive section configured to drive the protruding section; and a control section configured to control the drive section, wherein the control section causes the protruding section to protrude from the facing surface when a printing operation is started, and causes the protruding section to be housed when the printing operation is stopped.

5. The printing device, according to claim 2, further comprising:

a temperature sensor configured to measure the outside air temperature; and a power section configured to displace the heat shield section, wherein the power section displaces the heat shield section so as to change the distance between the heating section and the heat shield section based on the temperature of the outside air measured by the temperature sensor.

6. The printing device, according to claim 5, further comprising:

a drive section configured to change a protruding amount of the protruding section, wherein the drive section changes the protruding amount of the protruding section based on the distance between the heating section and the heat shield section.

7. The printing device according to claim 1, wherein the protruding section is formed of fabric.

* * * * *